J. WATSON.
Apparatus for Separating Ores.
No. 47,476.
Patented April 25, 1865.
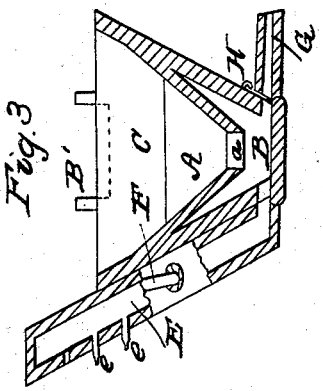
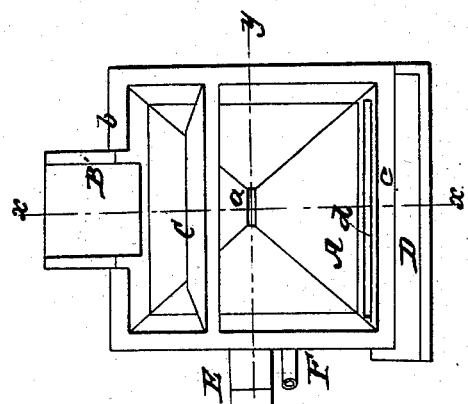
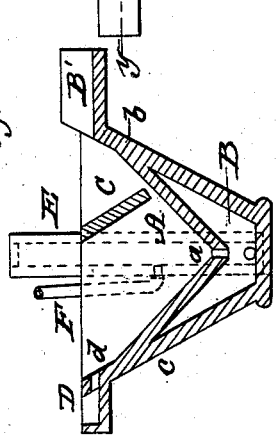

UNITED STATES PATENT OFFICE.

JAMES WATSON, OF CLIFF MINE, MICHIGAN.

IMPROVED APPARATUS FOR SEPARATING ORES.

Specification forming part of Letters Patent No. 47,476, dated April 25, 1865.

*To all whom it may concern:*

Be it known that I, JAMES WATSON, of Cliff Mine, in the county of Keweenaw and State of Michigan, have invented a new and Improved Ore-Separator; and I do hereby declare that the following is a full, clear, and exact description thereof, which will enable others skilled in the art to make and use the same, reference being had to the accompanying drawings, forming a part of this specification, in which—

Figure 1 is a vertical section of my invention, taken in the line $xx$, Fig. 2; Fig. 2, a plan or top view of the same; Fig. 3, a vertical section of the same, taken in the line $yy$, Fig. 2.

Similar letters of reference indicate like parts.

This invention relates to a new and improved device for separating the heavier masses of ore from the lighter portion or "slime," as it is technically termed; and it consists in the employment or use of a hopper provided with a deflecting-board and a chute, and also provided with an exit-chamber having a pipe or tube communicating with it, and provided with faucets or plugs, all arranged in such a manner as to effect a complete separation of the two parts of the ore specified.

A represents a hopper, which may be of inverted pyramidal form and provided with an opening, $a$, at its bottom, which forms a communication between the hopper and a chamber, B, underneath it, as shown in Figs. 1 and 3.

B' represents a trough, which leads into the hopper A at one side, $b$, of its upper end, and C is an inclined board placed within the hopper just in front of trough B', said board extending down to within a short distance of the side of the hopper below the trough B, (See Fig. 1.)

D is a chute or trough placed at the upper part of the hopper A, at the exterior of the side $c$, opposite to that where the trough B enters or communicates with it, and a slot or opening, $d$, is made in the side $c$ to form a communication between the chute D and the hopper, as shown in Fig. 1.

E represents a pipe or tube at the exterior of the hopper A, and having its lower end communicating with the chamber B. This pipe or tube E is provided with a series of faucets or plugs, $e$, placed one above the other near its upper part, and F is a pipe which communicates with E below the faucets or plugs, as shown clearly in Fig. 3.

G is a trough, which leads from the chamber B, and H is a gate placed between the chamber B and the trough G.

The operation is as follows: The ore, after being properly crushed, as usual, is conducted by means of water through the trough B' into the hopper A. The deflecting-board C causing all the particles of ore to descend toward the bottom of the hopper, the light particles of ore (the slime) instantly rises to the surface of the water and passes through the slot $d$ into the chute or trough D, and is carried off thereby. The deflecting-board C prevents the heavier particles of ore being washed or forced through the slot $d$ and carried off with the slime. The heavy particles of ore pass down into the chamber B, and are discharged therefrom by water, which is admitted into said chamber from the pipe or tube E, the water passing into E under slatic or other pressure from pipe E'. The force or pressure of the water in B may be regulated by the faucets or plugs $e$. If they are all allowed to remain closed, the full force or pressure of the water in B is obtained, and it will be reduced by opening or removing one or more of the plugs. The force or pressure of the water in B should of course be sufficient to carry off the ore from B through the trough G. Thus, by this simple arrangement, a complete separation of the light and heavy portions of the ore is obtained.

I claim as new, and desire to secure by Letters Patent—

1. The hopper A, provided with the deflecting-board C, chute or trough D, and the opening $a$ at its bottom, substantially as and for the purpose set forth.

2. The chamber B below the hopper, communicating with the pipe or tube E, provided with one or more plugs or faucets, and having water admitted into it under pressure, substantially as and for the purpose specified.

3. The combination of the hopper A, chamber B, pipe or tube E, provided with faucets or plugs, the deflecting-band C, and chute or trough D, all arranged to operate substantially as and for the purpose set forth.

JAMES WATSON.

Witnesses:
M. M. LIVINGSTON,
JAMES P. HALL.